(12) United States Patent
Riou

(10) Patent No.: US 9,104,890 B2
(45) Date of Patent: Aug. 11, 2015

(54) DATA PROCESSING DEVICE AND A SECURE MEMORY DEVICE INCLUDING THE SAME

(71) Applicant: SAMSUNG ELECTRONICS CO., LTD., Gyeonggi-do (KR)

(72) Inventor: Sebastien Riou, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 201 days.

(21) Appl. No.: 13/938,610

(22) Filed: Jul. 10, 2013

(65) Prior Publication Data

US 2014/0020095 A1   Jan. 16, 2014

(30) Foreign Application Priority Data

Jul. 12, 2012 (KR) .................. 10-2012-0076146

(51) Int. Cl.
| | |
|---|---|
| G06F 21/00 | (2013.01) |
| G06F 21/64 | (2013.01) |
| G06F 21/78 | (2013.01) |
| G06F 21/71 | (2013.01) |

(52) U.S. Cl.
CPC ............... G06F 21/64 (2013.01); G06F 21/71 (2013.01); G06F 21/78 (2013.01)

(58) Field of Classification Search
CPC ....... G06F 21/64; G06F 21/56; G06F 21/568; G06F 21/78; G02B 5/3033
See application file for complete search history.

(56) References Cited

U.S. PATENT DOCUMENTS

| | | | |
|---|---|---|---|
| 2005/0204212 A1* | 9/2005 | Noguchi et al. ............. | 714/710 |
| 2006/0265570 A1 | 11/2006 | Bancel et al. | |
| 2007/0014395 A1* | 1/2007 | Joshi et al. ................ | 380/28 |
| 2007/0188355 A1* | 8/2007 | Baek ............................ | 341/51 |
| 2007/0250703 A1 | 10/2007 | Giraud et al. | |
| 2009/0132875 A1* | 5/2009 | Kitahara et al. ............. | 714/721 |
| 2010/0054460 A1* | 3/2010 | Martinez et al. ............. | 380/28 |
| 2010/0082927 A1* | 4/2010 | Riou ........................... | 711/163 |

FOREIGN PATENT DOCUMENTS

| | | |
|---|---|---|
| JP | 2008-197810 | 8/2008 |
| KR | 1020020063679 | 8/2002 |

OTHER PUBLICATIONS

Bertoni et al., "On the propagation of faults and their detection in a hardware implementation of the Advanced Encryption Standard", Application-Specific Systems, Architectures and Processors, 2002. Proceedings. The IEEE International Conference on DOI: 10.1109/ASAP.2002.1030729., pp. 303-312.*

* cited by examiner

*Primary Examiner* — Hadi Armouche
*Assistant Examiner* — Cheng-Feng Huang
(74) *Attorney, Agent, or Firm* — F. Chau & Associates, LLC

(57) ABSTRACT

A data processing device includes a first register unit, a second register unit and a data handling unit. The first register unit generates an address signal based on a first control signal. The address signal points to a region in an external storage device where first data is stored. The second register unit receives the first data output from the external storage device, generates second data based on the first data and a second control signal, and selectively generates a detectable error in the second data according to an operating mode when a fault is injected into the first data. A bit number of the detectable error in the second data is larger than a bit number of the fault injected into the first data. The data handling unit selectively processes the second data depending on whether the detectable error is generated.

18 Claims, 14 Drawing Sheets

| INPUT (=DAT2) | OUTPUT (=DAT3) |
|---|---|
| 0000 | 0011 |
| 0001 | 0110 |
| 0010 | 1001 |
| 0011 | 0010 |
| 0100 | 0101 |
| 0101 | 1000 |
| 0110 | 0001 |
| 0111 | 0100 |
| 1000 | 0111 |
| 1001 | 0000 |
| 1010 | 1111 |
| 1011 | 1100 |
| 1100 | 1101 |
| 1101 | 1110 |
| 1110 | 1010 |
| 1111 | 1011 |

FIG. 5

| INSTRUCTION NUMBER | PC1 OUTPUT (=AS) | PC2 OUTPUT (=DAT3) | SECURE CODE (=DAT1) | NORMAL CODE (=DAT2) |
|---|---|---|---|---|
| #1 | 0 | 0 1 0 1 | 0 1 0 1 | 0 0 0 0 |
| #2 | 1 | 0 0 1 1 | 0 0 1 0 | 0 0 0 1 |
| #3 | 2 | 0 1 1 0 | 0 1 0 0 | 0 0 1 0 |
| #4 | 3 | 1 0 0 1 | 1 0 1 0 | 0 0 1 1 |
| ... | ... | ... | ... | ... |

FIG. 6

| INSTRUCTION NUMBER | PC1 OUTPUT (=AS) | PC2 OUTPUT (=DAT3) | SECURE CODE (=DAT1) | NORMAL CODE (=DAT2) |
|---|---|---|---|---|
| #1 | 0 | 0 1 0 1 | 0 1 1 1 | 0 0 1 0 |
| #2 | 1 | 1 0 0 1 | 0 0 1 0 | 1 0 1 1 |
| #3 | 2 | 1 1 0 0 | 0 1 0 0 | 1 0 0 0 |
| #4 | 3 | 0 1 1 1 | 1 0 1 0 | 1 1 0 1 |
| ... | ... | ... | ... | ... |

INJECTED ERROR (pointing to secure code of #1)

TRANSLATION (between SECURE CODE and NORMAL CODE for rows #2, #3, #4)

FIG. 8

| INSTRUCTION NUMBER | PC1 OUTPUT (=AS) | PC2 OUTPUT (=DAT3) | SECURE CODE (=DAT1) | NORMAL CODE (=DAT2) |
|---|---|---|---|---|
| #1 | 0 | 1 0 1 1 | 0 1 0 0 | 0 0 0 0 |
| #2 | 1 | 0 0 1 1 | 1 1 0 1 | 0 0 0 1 |
| #3 | 2 | 0 1 1 0 | 1 0 1 1 | 0 0 1 0 |
| #4 | 3 | 1 0 0 1 | 0 1 0 1 | 0 0 1 1 |
| ... | ... | ... | ... | ... |

FIG. 9

| INSTRUCTION NUMBER | PC1 OUTPUT (=AS) | PC2 OUTPUT (=DAT3) | SECURE CODE (=DAT1) | NORMAL CODE (=DAT2) |
|---|---|---|---|---|
| #1 | 0 | 1 0 1 1 | 0 1 0 <u>1</u> ← INJECTED ERROR | 0 0 0 1 |
| #2 | 1 | 0 1 1 0 →TRANSLATION | 1 1 0 1 | 0 1 0 0 |
| #3 | 2 | 0 1 0 1 →TRANSLATION | 1 0 1 1 | 0 0 0 1 |
| #4 | 3 | 0 1 1 0 →TRANSLATION | 0 1 0 1 | 1 1 0 0 |
| ... | ... | ... | ... | ... |

DATA PROCESSING DEVICE AND A SECURE MEMORY DEVICE INCLUDING THE SAME

CROSS-REFERENCE TO RELATED APPLICATION

This application claims priority under 35 U.S.C. §119 to Korean Patent Application No. 10-2012-0076146, filed on Jul. 12, 2012, in the Korean Intellectual Property Office (KIPO), the disclosure which is incorporated by reference herein in its entirety.

BACKGROUND

1. Technical Field

The inventive concept relates to data security, and more particularly, to a data processing device and a secure memory device including the data processing device.

2. Discussion of the Related Art

A secure memory device, such as a smart card, can process secure data, such as cryptographic keys, sensitive data or sensitive codes. However, errors may occur in the secure data due to malicious attacks coming from outside the secure memory device. For instance, the data stored in the secure memory device may be lost or corrupted by a fault-based attack that repeatedly injects faults into the data using a laser or X-ray.

SUMMARY

Exemplary embodiments of the inventive concept provide a data processing device capable of precisely detecting faults when the faults are injected into secure data.

Exemplary embodiments of the inventive concept provide a secure memory device including a data processing device capable of precisely detecting faults when the faults are injected into secure data.

According to an exemplary embodiment of the inventive concept, a data processing device includes a first register unit, a second register unit and a data handling unit. The first register unit generates an address signal based on a first control signal. The address signal points to a region in an external storage device where first data is stored. The second register unit receives the first data output from the external storage device, generates second data based on the first data and a second control signal, and selectively generates a detectable error in the second data according to an operating mode when a fault is injected into the first data. A bit number of the detectable error in the second data is larger than a bit number of the fault injected into the first data. The data handling unit selectively processes the second data depending on whether the detectable error is generated.

The operating mode may include a normal mode and a secure mode. The second register unit may generate the detectable error in the second data in the secure mode by increasing a fault in the second data, and may not generate the detectable error in the second data in the normal mode.

The first data may include a normal code in the normal mode and a secure code in the secure mode. The normal code may correspond to instructions sequentially executable in the data processing device. The secure code may be obtained by encrypting the normal code. The second data may include the normal code in the normal and secure modes. When the fault is injected into the first data in the secure mode, the fault in the second data is increased by increasing a number of error bits in the second data as the instructions are sequentially executed.

An operation of the data processing device may be terminated or a secure interrupt may be performed to protect data stored in the external storage device when the second data is determined to be invalid in the secure mode.

The first register unit may include a program counter block. The program counter block may generate the address signal, which is sequentially increased, based on the first control signal.

The second register unit may include a program counter block, a mode selection block and a calculation block. The program counter block may convert the second data into third data based on a translation table. The mode selection block may generate fourth data based on the third data and a mode selection signal. The calculation block may generate the second data based on the first data and the fourth data.

The mode selection block may include an AND gate. The AND gate may generate the fourth data by performing an AND operation on the third data and the mode selection signal.

The operating mode may include a normal mode and a secure mode. The fourth data may be different from the third data in the normal mode and may be substantially the same as the third data in the secure mode.

The calculation block may include an XOR gate. The XOR gate may generate the second data by performing an XOR operation on the first data and the fourth data.

The operating mode may include a normal mode and a secure mode. The second data may be substantially the same as the first data in the normal mode and may be different from the first data in the secure mode.

The data processing device may further include a control unit. The control unit may generate the first control signal and the second control signal.

The data processing device may include a microprocessor or a central processing unit (CPU).

The data handling unit may include a CPU state machine or an arithmetic and logic unit (ALU).

According to an exemplary embodiment of the inventive concept, a secure memory device includes a data storage device and a data processing device. The data storage device stores first data. The data processing device generates an address signal pointing to a region in the data storage device where the first data is stored, and processes second data corresponding to the first data received from the data storage device. The data processing device includes a first register unit, a second register unit and a data handling unit. The first register unit generates the address signal based on a first control signal. The second register unit receives the first data output from the data storage device, generates the second data based on the first data and a second control signal, and selectively generates a detectable error in the second data according to an operating mode when a fault is injected into the first data. A bit number of the detectable error in the second data is larger than a bit number of the fault injected into the first data. The data handling unit selectively processes the second data depending on whether the detectable error is generated.

The operating mode may include a normal mode and a secure mode. The first data may include normal data corresponding to the normal mode and secure data corresponding to the secure mode. The data storage device may include a first storage region for storing the secure data and a second storage region for storing the normal data.

An operation of the data processing device is terminated or interrupted when the bit number of the detectable error in the second data is larger than the bit number of the fault injected into the first data.

According to an exemplary embodiment of the inventive concept, a data processing device includes a first register unit configured to receive a first control signal and output an address to a data storage device in response to the first control signal; a second register unit configured to receive first data corresponding to the address from the data storage device and a second control signal, and output second data in response to the first data and the second control signal, wherein in a secure operating mode when the first data includes at least one fault bit, the second register unit is configured to generate the second data to have more fault bits than the first data; and a data handling unit configured to stop or interrupt an operation of the data processing device when the second data has more fault bits than the first data.

The data storage device may be outside the data processing device.

The second data may be generated to have more fault bits than the first data by providing an incremented address to the storage device and performing a logic operation on secure data associated with the incremented address and translation code corresponding to the incremented address.

The translation code may be stored in a table in the second register unit.

BRIEF DESCRIPTION OF THE DRAWINGS

The above and other features of the inventive concept will become more apparent by describing in detail exemplary embodiments thereof with reference to the accompanying drawings.

FIGS. 4 to 6 are diagrams for explaining an operation of the data processing device shown in FIG. 2, according to an exemplary embodiment of the inventive concept.

FIGS. 8 and 9 are diagrams for explaining an operation of the data processing device shown in FIG. 7, according to an exemplary embodiment of the inventive concept.

DETAILED DESCRIPTION OF THE EMBODIMENTS

Figure 1:
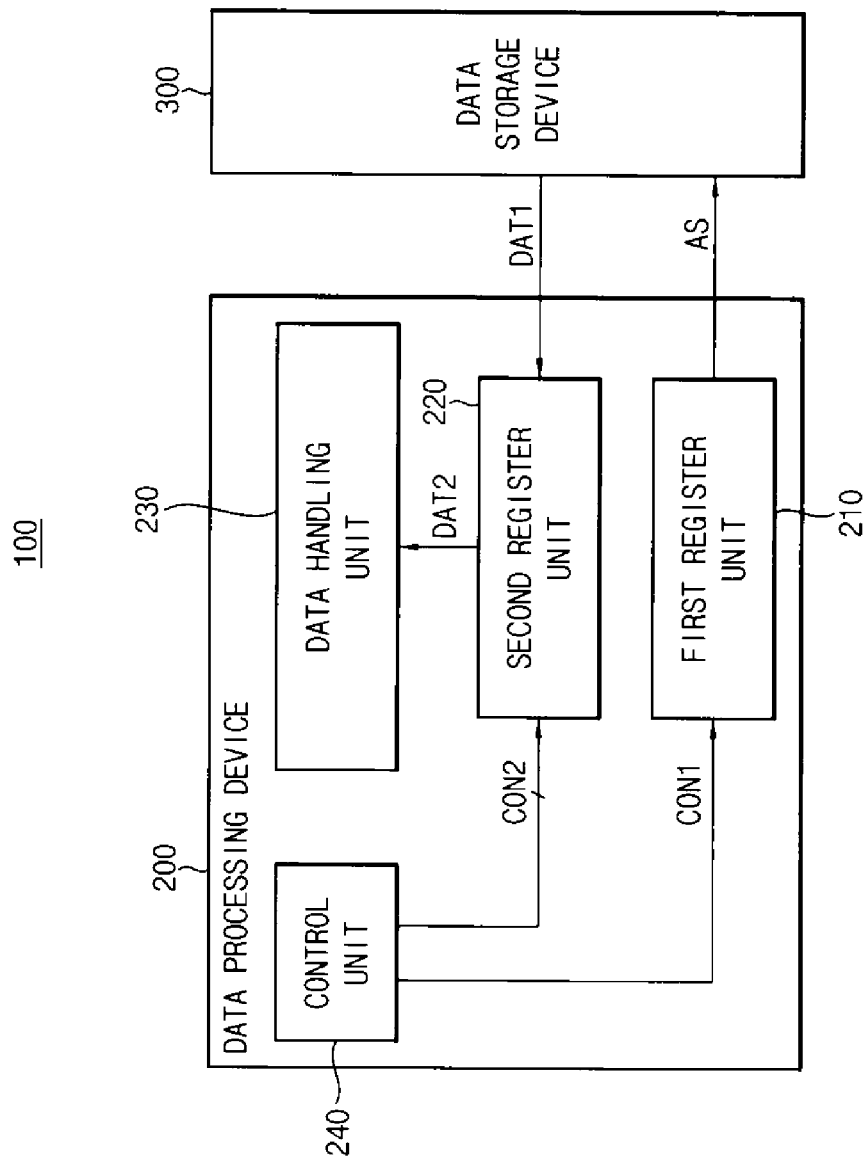
FIG. 1 is a block diagram illustrating an integrated circuit including a data processing device according to an exemplary embodiment of the inventive concept.

Exemplary embodiments of the inventive concept will be described more fully hereinafter with reference to the accompanying drawings. This inventive concept may, however, be embodied in many different forms and should not be construed as limited to the embodiments set forth herein. Like reference numerals may refer to like elements throughout this application.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

FIG. 1 is a block diagram illustrating an integrated circuit including a data processing device according to an exemplary embodiment of the inventive concept.

Referring to FIG. 1, the integrated circuit 100 includes a data processing device 200 and a data storage device 300.

The data processing device 200 receives data stored in the data storage device 300 and processes the received data. The data processing device 200 according to an exemplary embodiment of the inventive concept may have an operating mode including a first operating mode (e.g., a normal mode) and a second operating mode (e.g., a secure mode). In the normal mode, the data processing device 200 can receive and process normal data, which are not encrypted. In the secure mode, the data processing device 200 can receive encrypted secure data, can generate normal data by decrypting the encrypted secure data and can process the normal data. Hereinafter, exemplary embodiments of the inventive concept will be explained while focusing on the operation of the data processing device 200 in the secure mode.

The data processing device 200 includes a first register unit 210, a second register unit 220 and a data handling unit 230. The data processing device 200 may further include a control unit 240.

The first register unit 210 generates an address signal AS based on a first control signal CON1 and provides the address signal AS to the data storage device 300. The data storage device 300 stores first data DAT1 and the address signal AS points to a region in the data storage device 300 where the first data DAT1 is stored. The data storage device 300 receives the address signal AS and outputs the first data DAT1 corresponding to the address signal AS.

The second register unit 220 receives the first data DAT1 output from the data storage device 300 and generates second data DAT2 based on the first data DAT1 and a second control signal CON2. The first and second data DAT1 and DAT2 may be different from each other (e.g., the second data DAT2 is normal data and the first data DAT1 is secure data corresponding to the normal data) in the secure mode and may be substantially identical to each other (e.g., both of the first and second data DAT1 and DAT2 are normal data) in the normal mode.

When a fault is injected into the first data DAT1, the second register unit 220 selectively generates a detectable error in the second data DAT2 according to the operating mode of the data processing device 200. The number of bits in the detectable error may be larger than the number of bits in the fault injected into the first data DAT1. For instance, when the fault is injected into the first data DAT1 in the secure mode, the second register unit 220 may increase a fault in the second data DAT2 corresponding to the fault injected into the first data DAT1 to generate the detectable error. In other words, when a fault of 1 bit is injected into the first data DAT1, the fault of 1 bit exists in the second data DAT2 in the early stage of operation. As the second data DAT2 are repeatedly processed, the bit number of the fault in the second data DAT2 may be continuously increased, so that the detectable error may be generated in the second data DAT2. In the normal mode, the second register unit 220 may not generate the detectable error in the second data DAT2 even if faults are injected into the first data DAT1.

As will be described below with reference to FIG. 2, the first register unit 210 may include a first program counter block and the second register unit 220 may include a second program counter block. The first program counter block may output a value that is sequentially increased when the current data (e.g., instructions) are executed. The second program counter block may output a value that is updated based on a translation table when the current data (e.g., instructions) are executed.

The data handling unit 230 selectively processes the second data DAT2 depending on whether the detectable error is generated. For instance, when the second data DAT2 is determined to be valid because the detectable error is not generated, the data handling unit 230 can process the second data DAT2. When the second data DAT2 is determined to be invalid because the detectable error is generated, the data handling unit 230 does not process the second data DAT2. In this case, the operation of the data processing device 200 may be terminated by stopping the data processing operation or deleting the data stored in the data storage device 300, or a secure interrupt may be performed to protect the data stored in the data storage device 300.

The control unit 240 generates the first and second control signals CON1 and CON2. According to an exemplary embodiment of the inventive concept, the control unit 240 may control the overall operation of the data processing device 200.

In an exemplary embodiment of the inventive concept, the data processing device 200 may be a microprocessor or a central processing unit (CPU). In this case, the data handling unit 230 may include a CPU state machine or an arithmetic and logic unit (ALU).

A secure memory device, such as a smart card, includes a data storage device to store data requiring security (e.g., secure data) and a data processing device to process the secure data. The secure memory device may be subject to various attacks from hackers. For instance, the secure memory device may be subject to a fault-based attack that repeatedly injects faults into the data using a laser or X-ray. The fault-based attack may cause the loss or corruption of the secure data.

According to the related art, a separate detection device has been positioned outside a data processing device to detect attacks or faults applied from the outside. For this reason, a size of a secure memory device may be enlarged and power consumption may be increased. In addition, in the data processing device included in the secure memory device of the related art, the amount of injected faults is substantially equal to the amount of errors generated in the data, and thus if a small amount of faults are injected, the corrupted data may not be detected. In this case, the operating speed of the data processing device may be reduced and the performance of the data processing device may be degraded.

The data processing device 200 according to an exemplary embodiment of the inventive concept has a self-check function to take countermeasures by self-checking for attacks or faults applied from the outside. For instance, the data processing device 200 includes the first register unit 210 to generate the address signal AS and the second register unit 220 to translate the first data DAT1 (e.g., secure data) corresponding to the address signal AS into the second data DAT2 (e.g., normal data) in the secure mode. When the fault is injected into the first data DAT1 in the secure mode, the second register unit 220 increases the fault in the second data DAT2 corresponding to the fault injected into the first data DAT1 to generate the detectable error. If the second data DAT2 is determined to be invalid due to the generation of the detectable error, the operation of the data processing device 200 may be terminated or the secure interrupt may be performed. Therefore, the data processing device 200 can self-detect attacks or faults coming from the outside and can take countermeasures without reducing its operating speed and/or degrading its performance. In addition, a secure memory device having a reduced size and low power consumption can be implemented by using the data processing device 200.

Figure 2:
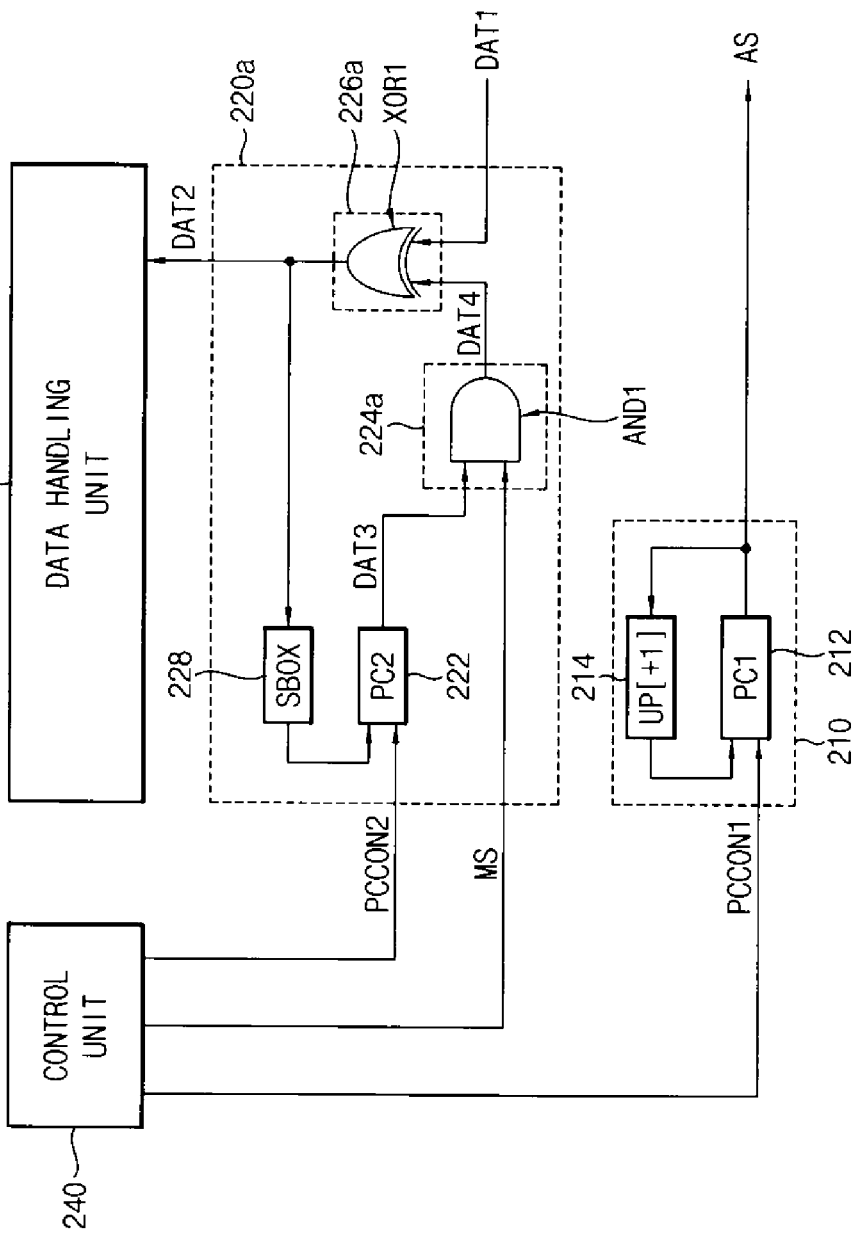
FIG. 2 is a diagram illustrating a data processing device included in the integrated circuit shown in FIG. 1, according to an exemplary embodiment of the inventive concept.
Figure 3:
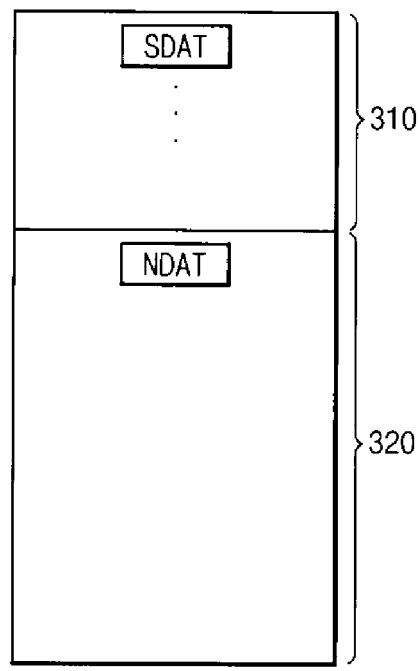
FIG. 3 is a diagram illustrating a data storage device included in the integrated circuit shown in FIG. 1, according to an exemplary embodiment of the inventive concept.

FIG. 2 is a diagram illustrating a data processing device included in the integrated circuit shown in FIG. 1, according to an exemplary embodiment of the inventive concept. FIG. 3 is a diagram illustrating a data storage device included in the integrated circuit shown in FIG. 1, according to an exemplary embodiment of the inventive concept.

Referring to FIGS. 2 and 3, the data processing device 200a includes a first register unit 210, a second register unit 220a and a data handling unit 230. The data processing device 200a may further include a control unit 240.

The first register unit 210 may include a first program counter block 212 and an up-counting block 214.

The first program counter block 212 may generate the address signal AS, which is sequentially increased, based on a first program counter control signal PCCON1 and the up-counting block 214. For instance, the address signal AS is reset to '0' in the early stage of operation and then sequentially increased by 1 (e.g., '1', '2', '3' . . . ) as the data processing operation is performed. The first program counter control signal PCCON1 may correspond to the first control signal CON1 in FIG. 1.

The data storage device 300 may include a first storage region 310 and a second storage region 320. The first storage region 310 may store secure data SDAT corresponding to the secure mode from among the first data DAT1, and the second storage region 320 may store normal data NDAT corresponding to the normal mode from among the first data DAT1. For instance, the secure data SDAT may be generated by encrypting the normal data NDAT. The data storage device 300 may supply the secure data SDAT corresponding to the address signal AS in the secure mode and supply the normal data NDAT corresponding to the address signal. AS in the normal mode.

The second register unit 220a may include a second program counter block 222, a mode selection block 224a, a calculation block 226a and a substitution box (SBOX) block 228.

The second program counter block 222 may convert the second data DAT2 into third data DAT3 based on a second program counter control signal PCCON2 and a translation table stored in the substitution box block 228. For instance, the third data DAT3 is reset to an initial value in the early stage of operation and then updated based on the translation table in the second program counter block 222 as the data processing operation is performed.

The mode selection block 224a may generate fourth data DAT4 based on the third data DAT3 and a mode selection signal MS. In this case, the fourth data DAT4 is different from the third data DAT3 in the normal mode and substantially the same as the third data DAT3 in the secure mode. The second program counter control signal PCCON2 and the mode selection signal MS may correspond to the second control signal CON2 in FIG. 1.

The calculation block 226a may generate the second data DAT2 based on the first data DAT1 and the fourth data DAT4. In this case, the second data DAT2 is substantially the same as the first data DAT1 in the normal mode and different from the first data DAT1 in the secure mode.

According to an exemplary embodiment of the inventive concept, the mode selection block 224a may include an AND gate AND1 that performs an AND operation on the third data DAT3 and the mode selection signal MS to generate the fourth data DAT4. The calculation block 226a may include an XOR gate XOR1 that performs an XOR operation on the first data DAT1 and the fourth data DAT4 to generate the second data DAT2. In this case, the mode selection signal MS may have a value of '0' in the normal mode and a value of '1' in the secure mode. In other words, in the normal mode, the AND gate AND1 may perform the AND operation with respect to each bit of the third data DAT3 and the mode selection signal MS having the value of '0' to generate the fourth data DAT4 having a value corresponding to '0' (e.g., a value different from the third data DAT3), and the XOR gate XOR1 may perform the XOR operation with respect to the fourth data DAT4 having a value corresponding to '0' and the first data DAT1 to generate the second data DAT2 having a value substantially identical to the first data DAT1. In the secure mode, the AND gate AND1 may perform the AND operation with respect to each bit of the third data DAT3 and the mode selection signal MS having the value of '1' to generate the fourth data DAT4 having a value substantially identical to the third data DAT3, and the XOR gate XOR1 may perform the XOR operation with respect to the fourth data DAT4 and the first data DAT1 to generate the second data DAT2 having a value different from the first data DAT1.

As described above with reference to FIG. 1, the data handling unit 230 may selectively execute the second data DAT2 and, as described above with reference to FIG. 2, the control unit 240 may generate the first program counter control signal PCCON1, the second program counter control signal PCCON2 and the mode selection signal MS.

According to an exemplary embodiment of the inventive concept, the second data DAT2 may be a normal code corresponding to the instructions sequentially executed in the data processing device 200a. The first data DAT1 may be a secure code, which is obtained by encrypting the normal code, in the secure mode, and may be substantially the same as the normal code in the normal mode. If the data processing device 200a is a microprocessor or a CPU, the data processing device 200a may sequentially read out codes corresponding to the instructions from the data storage device 300 according to the update of the address signal AS and may sequentially execute the instructions corresponding to the codes that have been read out. In the normal mode, the data processing device 200a may receive the normal code corresponding to the instructions to sequentially execute the instructions corresponding to the normal code. In the secure mode, the data processing device 200a may receive the secure code and translate the secure code into the normal code to sequentially execute the instructions corresponding to the normal code. In other words, the data processing device 200a may be implemented as a 1-dimensional address space where the address signal AS matches the normal code in the normal mode, and may be implemented as a 2-dimensional address space where the address signal AS matches the secure code and the secure code matches the normal code in the secure mode.

FIGS. 4 to 6 are diagrams for explaining an operation of the data processing device shown in FIG. 2, according to an exemplary embodiment of the inventive concept. FIG. 4 is a table showing an example of a translation table stored in the substitution box block 228 in FIG. 2. FIG. 5 shows the operation of the data processing device 200a when faults are not injected into the first data DAT1 (e.g., secure code) in the secure mode, and FIG. 6 shows the operation of the data processing device 200a when faults are injected into the first data DAT1 in the secure mode. In FIGS. 4 to 6, the secure code and the normal code are 4-bit digital codes.

Referring to FIGS. 2 and 4, the translation table may map the normal code, which is the input of the substitution box block 228 (e.g., second data DAT2), with the output of the second program counter block 222 (e.g., third data DAD) to be 1:1. For instance, the translation table may be preset by a CPU programming model and may be designed such that the faults in the second data DAT2 may increase corresponding to the faults injected into the first data DAT1.

Referring to FIGS. 2 and 5, the data processing device 200a may be designed such that the instructions are executed in the order of a first instruction #1, a second instruction #2, a third instruction #3, a fourth instruction #4 . . . in the secure mode. As the instructions are executed, the address signal AS may be sequentially increased by 1, and the normal code (e.g., second data DAT2) may also be sequentially increased by 1. For instance, the first instruction #1 may correspond to the normal code '0000'. In the same way, the second to fourth instructions #2 to #4 may correspond to the normal codes '0001', '0010' and '0011', respectively.

A value of the translation code, which is the output of the second program counter block 222 (e.g., third data DAT3), may be determined based on the previous normal code DAT2 corresponding to the instruction that was previously executed and the translation table of FIG. 4 stored in the substitution box block 228. Since the previously executed instruction does not exist in the early stage of operation, the initial value of the translation code used to generate the normal code '0000' corresponding to the first instruction #1 may be preset by the CPU programming model. In FIG. 5, the initial value of the translation code is set at '0101'. A value of the translation code to generate the normal code '0001' corresponding to the second instruction #2 may be determined as '0011' based on the normal code '0000' corresponding to the previous instruction #1 and the translation table of FIG. 4. In the same way, a value of the translation code to generate the normal code '0010' corresponding to the third instruction #3 may be determined as '0110' and a value of the translation code to generate the normal code '0011' corresponding to the fourth instruction #4 may be determined as '1001'.

The secure code (e.g., first data DAT1) may be preset by the CPU programming model such that the normal code DAT2 can be generated through the XOR operation with the third data DAT3 and the preset secure code may be stored in the data storage device 300. For instance, the secure code '0101', which generates the normal code '0000' corresponding to the first instruction #1 through the XOR operation with the initial value '0101' of the translation code, may be stored in the data storage device 300 in a position corresponding to an address '0'. In the same way, the secure codes '0010', '0100' and '1010', which generate the normal codes '0001', '0010' and '0011' corresponding to the second instruction #2, the third instruction #3 and the fourth instruction #4 through the XOR operation with the translation codes '0011', '0110' and '1001', respectively, may be stored in the data storage device 300 in positions corresponding to addresses '1', '2' and '3', respectively.

In the normal operation where faults are not injected into the secure code (e.g., first data DAT1), the first register unit 210 initializes the address signal AS to '0' in the early stage of operation and supplies the initialized address signal AS to the data storage device 300. The second register unit 220a receives the secure code '0101' stored in the address '0' of the data storage device 300 and generates the normal code '0000' corresponding to the first instruction #1 by performing the XOR operation with respect to the initial value '0101' of the translation code and the received secure code '0101'. The data handling unit 230 executes the first instruction #1 based on the normal code '0000'.

After the first instruction #1 has been executed, the translation code is updated to '0011' based on the translation table of FIG. 4. In addition, to read out the secure code '0010' corresponding to the second instruction #2 to be executed next, the first register unit 210 updates the address signal AS to '1'. The second register unit 220a receives the secure code '0010' stored in the address '1' of the data storage device 300 and generates the normal code '0001' corresponding to the second instruction #2 by performing the XOR operation with respect to the updated translation code '0011' and the received secure code '0010'. The data handling unit 230 executes the second instruction #2 based on the normal code '0001'.

In the same manner, the translation code is updated to '0110' and the address signal AS is updated to '2' after the second instruction #2 has been executed. The second register unit 220a generates the normal code '0010' by performing the XOR operation with respect to the updated translation code '0110' and the received secure code '0100' corresponding to the address '2', and the data handling unit 230 executes the third instruction #3 based on the normal code '0010'. The translation code is updated to '1001' and the address signal AS is updated to '3' after the third instruction #3 has been executed. In addition, the second register unit 220a generates the normal code '0011' by performing the XOR operation with respect to the updated translation code '1001' and the received secure code '1010' corresponding to the address '3', and the data handling unit 230 executes the fourth instruction #4 based on the normal code '0011'.

Referring to FIGS. 2 and 6, in an abnormal operation where faults are injected into the secure code (e.g., first data DAT1), the first register unit 210 initializes the address signal AS to '0' in the early stage of operation and supplies the initialized address signal AS to the data storage device 300. The second register unit 220a receives the secure code stored in the address '0' of the data storage device 300. At this time, the fault of 1 bit is injected into the secure code (for instance, the second-lowest bit of the secure code) so that the secure code '0111' is received, which is different from the example shown in FIG. 5 in which the secure code of '0101' is received. The second register unit 220a generates the normal code '0010' by performing the XOR operation with respect to the initial value '0101' of the translation code and the received secure code '0111'. In other words, in comparison with the example shown in FIG. 5, a fault of 1 bit is generated in the normal code corresponding to the first instruction #1.

The translation code is updated to '1001' based on the normal code '0010' and the translation table of FIG. 4. In addition, to read out the second instruction #2 to be executed next, the first register unit 210 updates the address signal AS to '1'. The second register unit 220a receives the secure code '0010' stored in the address '1' of the data storage device 300 and generates the normal code '1011' by performing the XOR operation with respect to the updated translation code '1001' and the received secure code '0010'. In other words, in comparison with the example shown in FIG. 5, a fault of 2 bits is generated in the normal code corresponding to the second instruction #2.

In the same manner, the translation code is updated to '1100' based on the normal code '1011' and the translation table of FIG. 4 and the address signal AS is updated to '2'. The second register unit 220a generates the normal code '1000' by performing the XOR operation with respect to the updated translation code '1100' and the received secure code '0100' corresponding to the address '2'. In comparison with the example shown in FIG. 5, a fault of 2 bits is generated in the normal code corresponding to the third instruction #3. In addition, the translation code is updated to '0111' based on the normal code '1000' and the translation table of FIG. 4 and the address signal AS is updated to '3'. The second register unit 220a generates the normal code '1101' by performing the XOR operation with respect to the updated translation code '0111' and the received secure code '1010' corresponding to the address '3'. In comparison with the example shown in FIG. 5, a fault of 3 bits is generated in the normal code corresponding to the fourth instruction #4.

According to an exemplary embodiment of the inventive concept, the data processing device 200a can determine whether the normal code corresponding to the instructions is valid and can selectively execute the instructions based on the determination result. For instance, the data processing device 200a can determine the validation of the normal code based on a reference number of fault bits and the number of fault bits in the normal code. In the example of FIG. 6, if the reference number of fault bits is 3, the normal codes '0010', '1011' and '1000' may be determined to be valid codes because the faults of 1 bit, 2 bits and 2 bits are generated in the codes '0010', '1011' and '1000', respectively. However, the normal code '1101' may be determined to be invalid because the fault of 3 bits is generated in the code '1101'. If the normal codes are determined to be valid, the instructions corresponding to the normal codes may be executed. If the normal codes are determined to be invalid, the address signal AS and the translation code DAT3 are loaded as predetermined values by the CPU programming model or a linker, and the reset operation, the interrupt operation and/or the jump operation are performed based on the loaded address signal AS and the translation code DAT3 to terminate the operation of the data processing device 200a or to perform the secure interrupt.

In the case of a data processing device according to the conventional art which uses normal codes without using secure codes, the number of fault bits may not increase in the normal code of a next instruction even if a fault is injected into the normal code of a current instruction while the instructions are being sequentially executed in the secure mode. Therefore, the fault may not be detected by the data processing device of the conventional art if a fine fault (e.g., a fault of 1 bit) is injected into the normal code.

In an exemplary embodiment of the inventive concept, the data processing device 200a may be implemented as a 2-dimensional address space which receives the secure codes based on the address signal AS, generates the normal codes based on the secure codes, and executes the instructions corresponding to the normal codes. In addition, as shown in FIG. 6, if a fine fault (e.g., a fault of 1 bit) is injected into the normal code of a current instruction (e.g., first instruction #1), the number of fault bits may be gradually increased in the normal codes of next instructions (e.g., second to fourth instructions #2, #3 and #4). In other words, the data processing device 200a can increase the number of faults in the normal code to generate the detectable error, and thus can self-detect the attacks or faults applied from the outside to take countermeasures without reducing the operating speed of the data processing device 200a and/or degrading the performance of the data processing device 200a.

In other words, the data processing device 200a according to an exemplary embodiment of the inventive concept can continuously check whether the instructions included in its software are precisely fetched and executed according to a predetermined order in the secure mode. If the instruction is corrupted due to the injection of a fault during the execution of the instructions, the corruption of the instruction is rapidly propagated and diffused. Thus, the data processing device 200a may execute a pseudo random code that accesses the invalid address or executes the invalid instruction and can rapidly determine the fault injection. Therefore, integrity in the execution of the device's software can be improved. In addition, since the data processing device 200a according to an exemplary embodiment of the inventive concept sets the secure code with respect to the data and/or instructions requiring security, the security level of the data can be improved without excessive degradation to the device's performance.

Figure 7:
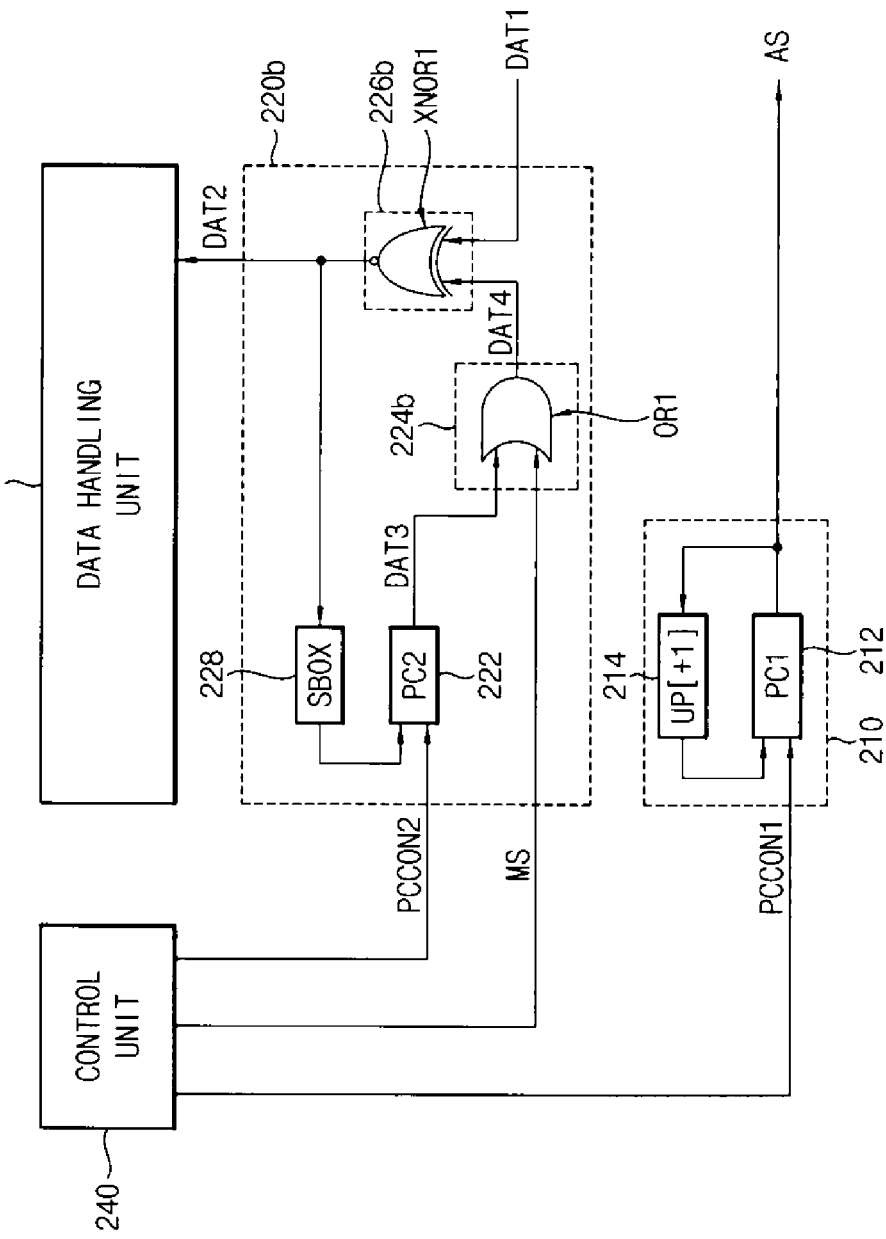
FIG. 7 is a diagram illustrating a data processing device included in the integrated circuit shown in FIG. 1, according to an exemplary embodiment of the inventive concept.

FIG. 7 is a diagram illustrating a data processing device included in the integrated circuit shown in FIG. 1, according to an exemplary embodiment of the inventive concept.

Referring to FIG. 7, the data processing device 200b includes a first register unit 210, a second register unit 220b and a data handling unit 230. In addition, the data processing device 200b may further include a control unit 240.

The first register unit 210, the data handling unit 230 and the control unit 240 may be substantially identical to the first register unit 210, the data handling unit 230 and the control unit 240 shown in FIG. 2. The first register unit 210 may include a first program counter block 212 and an up-counting block 214. The first program counter block 212 may generate the address signal AS, which is sequentially increased, based on a first program counter control signal PCCON1 and the up-counting block 214. The data handling unit 230 may selectively process the second data DAT2 and the control unit 240 may generate the first program counter control signal PCCON1, the second program counter control signal PCCON2 and the mode selection signal MS.

The second register unit 220b may include a second program counter block 222, a mode selection block 224b, a calculation block 226b and a substitution box block 228.

The second program counter block 222 may translate the second data DAT2 into the third data DAT3 based on the second program counter control signal PCCON2 and a translation table stored in the substitution box block 228. The mode selection block 224b may generate the fourth data DAT4 based on the third data DAT3 and the mode selection signal MS. The calculation block 226b may generate the second data DAT2 based on the first data DAT1 and the fourth data DAT4.

According to an exemplary embodiment of the inventive concept, the mode selection block 224b may include an OR gate OR1 that performs an OR operation on the third data DAT3 and the mode selection signal MS to generate the fourth data DAT4. The calculation block 226b may include an XNOR gate XNOR1 that performs an XNOR operation on the first data DAT1 and the fourth data DAT4 to generate the second data DAT2. In this case, the mode selection signal MS may have a value of '1' in the normal mode and a value of '0' in the secure mode. In other words, in the normal mode, the OR gate OR1 may perform the OR operation with respect to each bit of the third data DAT3 and the mode selection signal MS having the value of '1' to generate the fourth data DAT4 having a value corresponding to '1' (e.g., a value different from the third data DAT3), and the XNOR gate XNOR1 may perform the XNOR operation with respect to the fourth data DAT4 having a value corresponding to '1' and the first data DAT1 to generate the second data DAT2 having a value substantially identical to the first data DAT1. In the secure mode, the OR gate OR1 may perform the OR operation with respect to each bit of the third data DAT3 and the mode selection signal MS having the value of '0' to generate the fourth data DAT4 having a value substantially identical to the third data DAT3, and the XNOR gate XNOR1 may perform the XNOR operation with respect to the fourth data DAT4 and the first data DAT1 to generate the second data DAT2 having a value different from the first data DAT1.

FIGS. 8 and 9 are diagrams for explaining an operation of the data processing device shown in FIG. 7, according to an exemplary embodiment of the inventive concept. FIG. 8 shows the operation of the data processing device 200h when faults are not injected into the first data DAT1 (e.g., secure code) in the secure mode and FIG. 9 shows the operation of the data processing device 200b when faults are injected into the first data DAT1 in the secure mode. In FIGS. 8 and 9, the secure code and the normal code are 4-bit data codes.

Referring to FIGS. 7 and 8, the data processing device 200b may be designed such that the instructions are executed in the order of a first instruction #1, a second instruction #2, a third instruction #3, a fourth instruction #4 . . . in the secure mode. As the instructions are executed, the address signal AS may be sequentially increased by 1, and the normal code (e.g., second data DAT2) may also be sequentially increased by 1. For instance, the first instruction #1 may correspond to the normal code '0000'. In the same way, the second to fourth instructions #2 to #4 may correspond to the normal codes '0001', '0010' and '0011', respectively.

A value of the translation code, which is the output of the second program counter block 222 (e.g., third data DAT3), may be determined based on the previous normal code DAT2 corresponding to the instruction that was previously executed and the translation table of FIG. 4 stored in the substitution box block 228. In FIG. 8, the initial value of the translation code is set at '1011'. A value of the translation code to generate the normal code '0001' corresponding to the second instruction #2 may be determined as '0011', a value of the translation code to generate the normal code '0010' corresponding to the third instruction #3 may be determined as '0110' and a value of the translation code to generate the normal code '0011' corresponding to the fourth instruction #4 may be determined as '1001'.

The secure code (e.g., first data DAT1) may be preset by the CPU programming model such that the normal code DAT2 can be generated through the XNOR operation with the third data DAT3 and the preset secure code may be stored in the data storage device 300. For instance, the secure code '0100', which generates the normal code '0000' corresponding to the first instruction #1 through the XNOR operation with the initial value '1011' of the translation code, may be stored in the data storage device 300 in a position corresponding to an address '0'. In the same way, the secure codes '1101', '1011' and '0101', which generate the normal codes '0001', '0010' and '0011' corresponding to the second instruction #2, the third instruction #3 and the fourth instruction #4 through the XNOR operation with the translation codes '0011', '0110' and '0101', respectively, may be stored in the data storage device 300 in positions corresponding to addresses '1', '2' and '3', respectively.

In the normal operation where faults are not injected into the secure code (e.g., first data DAT1), the first register unit 210 initializes the address signal AS to '0' in the early stage of operation and supplies the initialized address signal AS to the data storage device 300. The second register unit 220b receives the secure code '0100' stored in the address '0' of the data storage device 300 and generates the normal code '0000' corresponding to the first instruction #1 by performing the XNOR operation with respect to the initial value '1011' of the translation code and the received secure code '0100'. The data handling unit 230 executes the first instruction #1 based on the normal code '0000'.

After the first instruction #1 has been executed, the translation code is updated to '0011' based on the translation table of FIG. 4. In addition, to read out the secure code '1101' corresponding to the second instruction #2 to be executed next, the first register unit 210 updates the address signal AS to '1'. The second register unit 220b receives the secure code '1101' stored in the address '1' of the data storage device 300 and generates the normal code '0001' corresponding to the second instruction #2 by performing the XNOR operation with respect to the updated translation code '0011' and the received secure code '1101'. The data handling unit 230 executes the second instruction #2 based on the normal code '0001'.

In the same manner, the translation code is updated to '0110' and the address signal AS is updated to '2' after the second instruction #2 has been executed. The second register unit 220b generates the normal code '0010' by performing the XNOR operation with respect to the updated translation code '0110' and the received secure code '1011' corresponding to the address '2', and the data handling unit 230 executes the third instruction #3 based on the normal code '0010'. The translation code is updated to '1001' and the address signal AS is updated to '3' after the third instruction #3 has been executed. In addition, the second register unit 220b generates the normal code '0011' by performing the XNOR operation with respect to the updated translation code '1001' and the received secure code '0101' corresponding to the address '3', and the data handling unit 230 executes the fourth instruction #4 based on the normal code '0011'.

Referring to FIGS. 7 and 9, in an abnormal operation where faults are injected into the secure code (e.g., first data DAT1), the first register unit 210 initializes the address signal AS to '0' in the early stage of operation and supplies the initialized address signal AS to the data storage device 300. The second register unit 220b receives the secure code stored in the address '0' of the data storage device 300. At this time, a fault of 1 bit is injected into the secure code (for instance, the least significant bit of the secure code) so that the secure code '0101' is received, which is different from the example shown in FIG. 8 in which the secure code '0100' is received. The second register unit 220b generates the normal code '0001' by performing the XNOR operation with respect to the initial value '1011' of the translation code and the received secure code '0101'. In other words, in comparison with the example shown in FIG. 8, a fault of 1 bit is generated in the normal code corresponding to the first instruction #1.

The translation code is updated to '0110' based on the normal code '0001' and the translation table of FIG. 4. In addition, to read out the second instruction #2 to be executed next, the first register unit 210 updates the address signal AS to '1'. The second register unit 220b receives the secure code '1101' stored in the address '1' of the data storage device 300 and generates the normal code '0100' by performing the XNOR operation with respect to the updated translation code '0110' and the received secure code '1101'. In other words, in comparison with the example shown in FIG. 8, a fault of 2 bits is generated in the normal code corresponding to the second instruction #2.

In the same manner, the translation code is updated to '0101' based on the normal code '0100' and the translation table of FIG. 4 and the address signal AS is updated to '2'. The second register unit 220b generates the normal code '0001' by performing the XNOR operation with respect to the updated translation code '0101' and the received secure code '1011' corresponding to the address '2'. In comparison with the example shown in FIG. 8, a fault of 2 bits is generated in the normal code corresponding to the third instruction #3. In addition, the translation code is updated to '0110' based on the normal code '0001' and the translation table of FIG. 4 and the address signal AS is updated to '3'. The second register unit 220b generates the normal code '1100' by performing the XNOR operation with respect to the updated translation code '0110' and the received secure code '0101' corresponding to the address '3'. In comparison with the example shown in FIG. 8, a fault of 4 bits is generated in the normal code corresponding to the fourth instruction #4.

According to an exemplary embodiment of the inventive concept, the data processing device 200b can determine whether the normal codes corresponding to the instructions are valid and can selectively execute the instructions based on the determination result. For instance, the data processing device 200b can determine the validation of the normal codes based on a reference number of fault bits and the number of fault bits in the normal code. In the example of FIG. 9, if the reference number of fault bits is 3, the normal codes '0001', '0100' and '0001' may be determined to be valid codes because the faults of 1 bit, 2 bits and 2 bits are generated in the codes '0001', '0100' and '0001', respectively. However, the normal code '1100' may be determined to be invalid because the fault of 4 bits is generated in the code '1100'. If the normal codes are determined to be valid, the instructions corresponding to the normal codes may be executed. If the normal codes are determined to be invalid, the operation of the data processing device 200a may be terminated or the secure interrupt may be performed.

Figure 10:
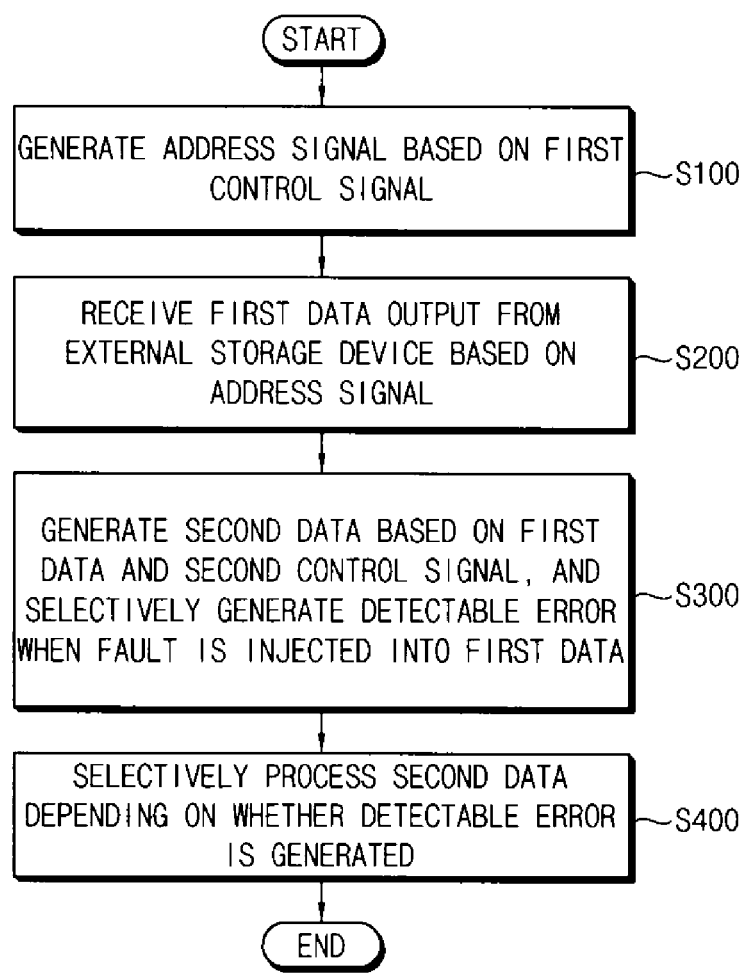
FIG. 10 is a flowchart illustrating a method of processing data according to an exemplary embodiment of the inventive concept.

FIG. 10 is a flowchart illustrating a method of processing data according to an exemplary embodiment of the inventive concept.

Referring to FIGS. 1 and 10, in the method of processing data according to an exemplary embodiment of the inventive concept, the address signal AS is generated based on the first control signal CON1 (S100), the first data DAT1 output from an external storage device (e.g., data storage device 300) is received based on the address signal AS (S200), the second data DAT2 is generated based on the first data DAT1 and the second control signal CON2 and the detectable error is selectively generated in the second data DAT2 according to an operating mode when a fault is injected into the first data DAT1 (S300), and the second data DAT2 is selectively processed depending on whether the detectable error is generated (S400). For instance, the operating mode may include the normal mode and the secure mode. In the secure mode, if the fault is injected into the first data DAT1, the fault in the second data DAT2 is increased to generate the detectable error. In the normal mode, the detectable error may not be generated in the second data DAT2 even if the fault is injected into the first data DAT1.

According to an exemplary embodiment of the inventive concept, the second data DAT2 may be a normal code corresponding to the instructions sequentially executed in the data processing device 200. The first data DAT1 may be a secure code, which is obtained by encrypting the normal code, in the secure mode, and may be substantially identical to the normal code in the normal mode.

Figure 11:
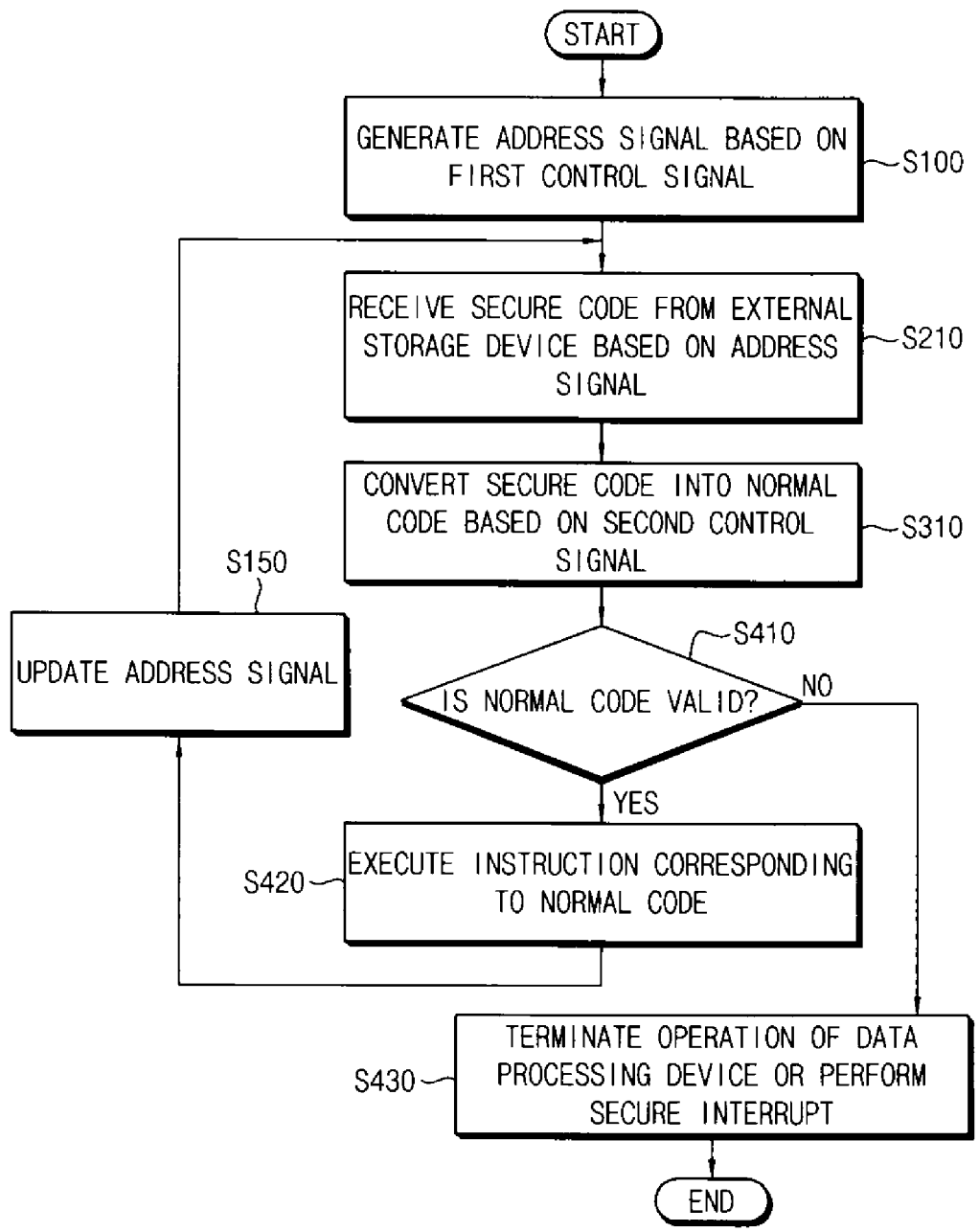
FIG. 11 is a flowchart illustrating a method of processing data, according to an exemplary embodiment of the inventive concept.

FIG. 11 is a flowchart illustrating a method of processing data, according to an exemplary embodiment of the inventive concept. FIG. 11 shows a method of processing data in the secure mode.

Referring to FIGS. 2, 3 and 11, the first register unit 210 may generate the address signal AS based on the first control signal (e.g., the first program counter control signal PCCON1) (S100). The address signal AS points to a region in an external storage device (e.g., the data storage device 300) where first data is stored and the address signal AS can be sequentially increased through an update operation (S150).

The second register unit 220a may receive the secure code (e.g., first data DAT1) output from the data storage device 300 based on the address signal AS (S210) and can convert the secure code into the normal code (e.g., second data DAT2) based on the second control signal (e.g., the second program counter control signal PCCON2) and the mode selection signal MS (S310).

The data handling unit 230 can determine the validation of the normal code (S410). For instance, the data handling unit 230 may determine the validation of the normal code based on the reference number of fault bits and the number of faults in the normal code.

If the normal code is determined to be valid (S410: yes), the instruction corresponding to the normal code may be executed (S420) and the address signal AS may be updated (S150). S210, S310 and S410 may be repeated based on the updated address signal AS. For instance, as shown in FIG. 5, the secure code and the normal code may be sequentially updated and the instructions corresponding to the normal code may be sequentially executed.

If the normal code is determined to be invalid (S410: no), the operation of the data processing device 200a may be terminated or the secure interrupt may be performed (S430). For instance, as shown in FIG. 6, if a fault is injected into the secure code, the number of fault bits in the normal code may be gradually increased corresponding to the faults injected into the secure code. In addition, if the number of fault bits in the normal code is equal to or higher than the reference number of the fault bits, the normal code may be determined to be invalid (in other words, the detectable error may be generated). In this case, the operation of the data processing device 200a may be terminated or the secure interrupt may be performed to protect the data.

Figure 12:
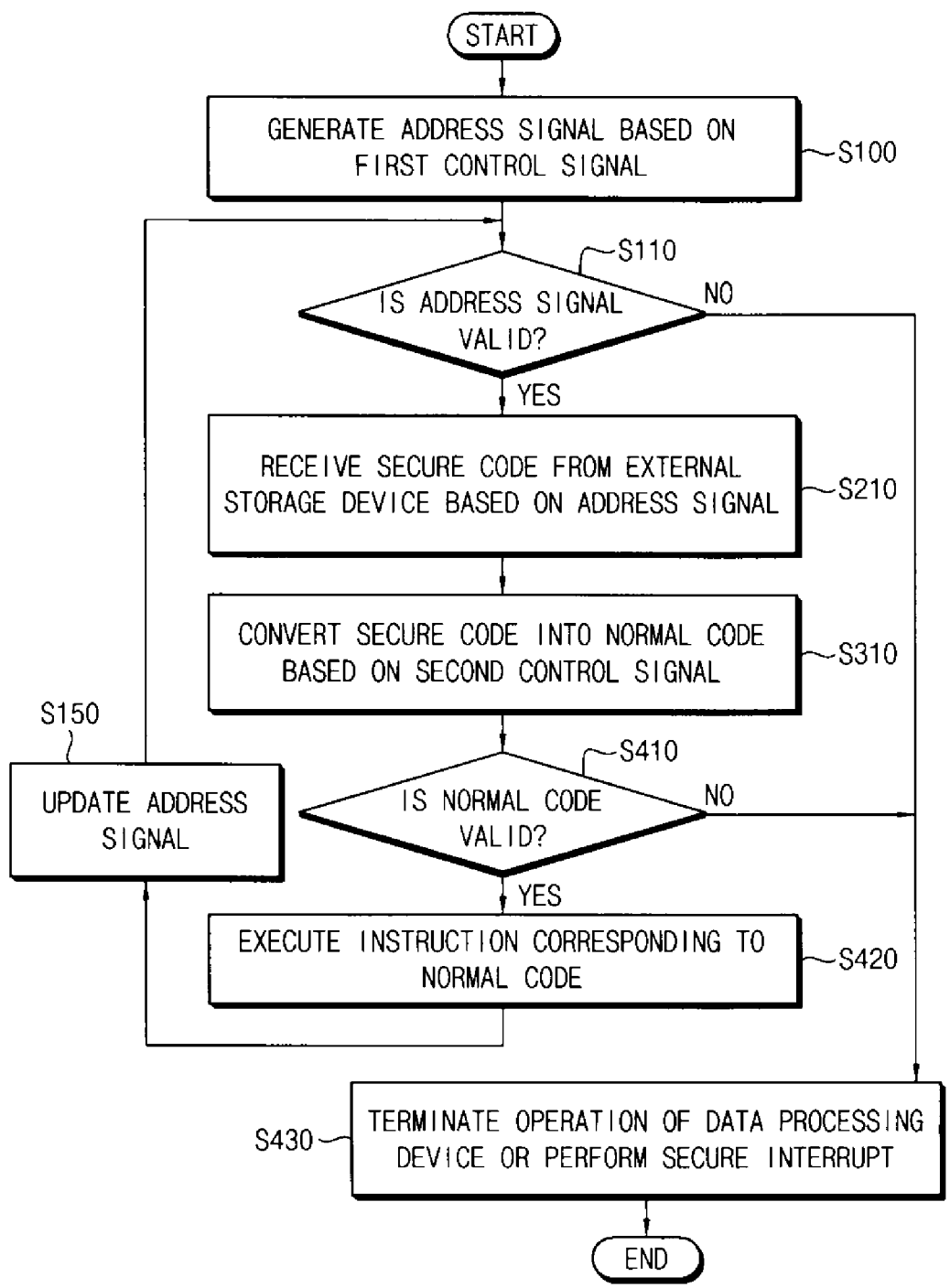
FIG. 12 is a flowchart illustrating a method of processing data, according to an exemplary embodiment of the inventive concept.

FIG. 12 is a flowchart illustrating a method of processing data, according to an exemplary embodiment of the inventive concept. FIG. 12 shows a method of processing data in the secure mode.

Referring to FIGS. 2, 3 and 12, the first register unit 210 may generate the address signal AS based on the first control signal (e.g., the first program counter control signal PCCON1) (S100). The data handling unit 230 can determine the validation of the address signal AS (S110).

If the address signal AS is determined to be valid (S110: yes), the second register unit 220a may receive the secure code (e.g., first data DAT1) output from the data storage device 300 based on the address signal AS (S210) and can convert the secure code into the normal code (e.g., second data DAT2) based on the second control signal (e.g., the second program counter control signal PCCON2) and the mode selection signal MS (S310).

The data handling unit 230 can determine the validation of the normal code (S410). If the normal code is determined to be valid (S410: yes), the instruction corresponding to the normal code may be executed (S420) and the address signal AS may be updated (S150).

If the address signal AS is determined to be invalid (S110: no) or the normal code is determined to be invalid (S410: no), the operation of the data processing device 200a may be terminated or the secure interrupt may be performed (S430).

Figure 13:
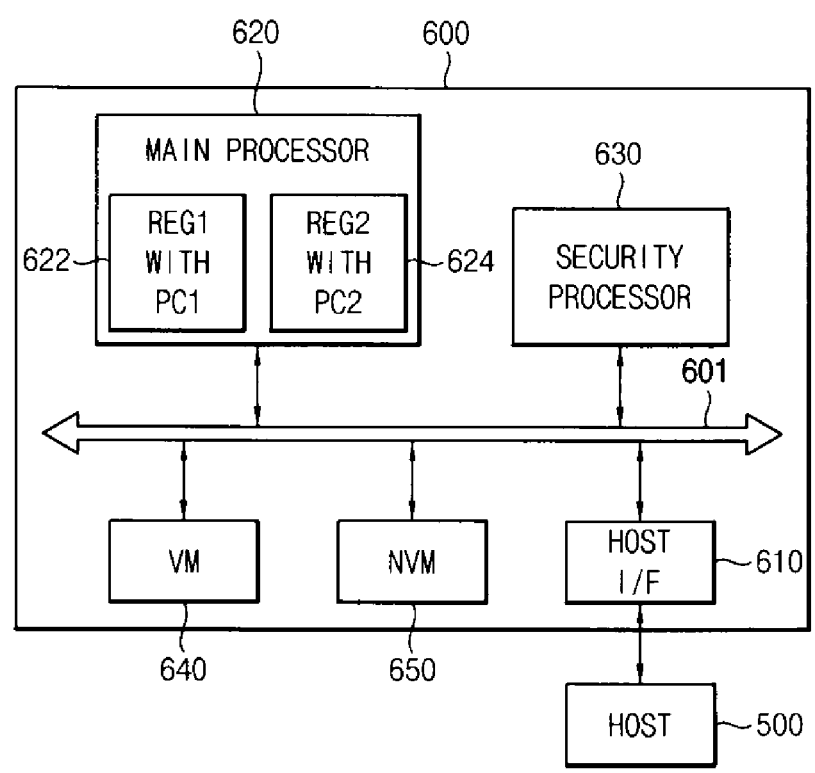
FIG. 13 is a block diagram illustrating a system including a secure memory device according to an exemplary embodiment of the inventive concept.

FIG. 13 is a block diagram illustrating a system including a secure memory device according to an exemplary embodiment of the inventive concept.

Referring to FIG. 13, the system 400 includes a host 500 and a secure memory device 600.

The secure memory device 600 includes a host interface 610, a main processor 620, a security processor 630, a volatile memory 640 and a nonvolatile memory 650. These components are electrically connected with each other through an internal bus 601 to transceive signals. For instance, the secure memory device 600 may be a smart card.

The host interface 610 is connected to the host 500. The main processor 620 can communicate with the host 500 through the host interface 610. The host interface 610 may be configured to communicate with the host 500 using at least one of various interface protocols, such as a universal serial bus (USB) protocol, a multi-media card (MMC) protocol, a peripheral component interconnect-express (PCI-E) protocol, a small computer system interface (SCSI) protocol, a serial-attached SCSI (SAS) protocol, a serial advanced technology attachment (SATA) protocol, a parallel advanced technology attachment (PATA) protocol, an enhanced small disk interface (ESDI) protocol, an integrated drive electronics (IDE) protocol, etc.

The main processor 620 controls the overall operation of the secure memory device 600. For example, the main processor 620 may control the volatile memory 640 and the nonvolatile memory 650, and may fetch instructions and data to process the fetched instructions and the fetched data. The main processor 620 may include a microprocessor or a central processing unit (CPU).

The main processor 620 may be the data processing device 200 included in the integrated circuit 100 of FIG. 1. The main processor 620 includes a first register unit 622 to generate the address signal AS and a second register unit 624 to translate the first data DAT1 corresponding to the address signal AS into the second data DAT2. The first register unit 622 may include a first program counter block and the second register unit 624 may include a second program counter block. If a fault is injected into the first data DAT1 in a secure mode of the main processor 620, the second register unit 624 increases the faults in the second data DAT2 corresponding to the faults injected into the first data DAT1 to generate detectable errors. If the second data DAT2 are determined to be invalid due to the generation of the detectable errors, the operation of the main processor 620 may be finished or the secure interrupt may be performed. Therefore, the main processor 620 can be equipped with a self-check function to self-detect attacks or faults applied from the outside and can take countermeasures without reducing its operating rate and/or degrading its performance. In addition, the size and the power consumption of the secure memory device 600 can be reduced.

The security processor 630 may be tamper-resistant against tampering attacks, such as micro-probing, a software attack, eavesdropping, a fault generation attack, etc. For example, the security processor 630 may include a fault detector, a power glitch detector, a laser detector, an abnormal condition detector, a reset detector, a metal shield, a data path encryption, a true random number generator, etc. In an exemplary embodiment of the inventive concept, the main processor 620 and the security processor 630 may be implemented as separate integrated circuits or chips. In an exemplary embodiment of the inventive concept, the security processor 630 may be built in the main processor 620 as a processing block. According to an exemplary embodiment of the inventive concept, the security processor 630 can be omitted if the main processor 620 has the self-check function.

The volatile memory 640 may serve as a cache memory or a working memory for the main processor 620. For example, the volatile memory 640 may be implemented by a dynamic random access memory (DRAM), a static random access memory (SRAM), a mobile DRAM, or the like.

The nonvolatile memory 650 may store a boot image, which is executed as power is supplied to the secure memory device 600, as well as secure data and/or other normal data. For example, the nonvolatile memory 650 may be implemented by an electrically erasable programmable read-only memory (EEPROM), a flash memory, a phase change random access memory (PRAM), a resistive random access memory (RRAM), a magnetoresistive random access memory (MRAM), a ferroelectric random access memory (FRAM), a nano floating gate memory (NFGM), a polymer random access memory (PoRAM), or the like.

The volatile memory 640 and/or the nonvolatile memory 650 may store the first data DAT1 and can supply the first data DAT1 based on the address signal AS generated from the main processor 620.

Although not shown in FIG. 13, the secure memory device 600 may further include a memory controller to control the volatile memory 640 and the nonvolatile memory 650.

Figure 14:
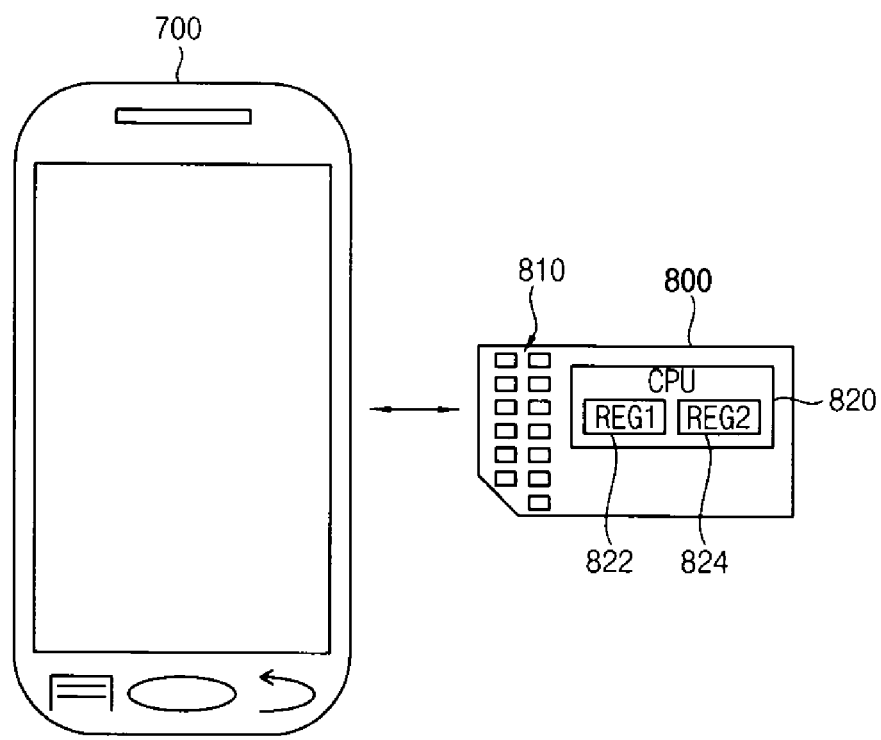
FIG. 14 is a diagram illustrating an example of a secure memory device, according to an exemplary embodiment of the inventive concept, applied to a mobile appliance.

FIG. 14 is a diagram illustrating an example of a secure memory device, according to an exemplary embodiment of the inventive concept, applied to a mobile appliance.

Referring to FIG. 14, a system is shown that includes a mobile appliance 700 and a secure memory device 800.

The secure memory device 800 includes a plurality of connection pins 810 and a main processor 820. Although not shown in FIG. 14, the secure memory device 800 may further include an internal bus, a host interface, a security processor, a volatile memory and a nonvolatile memory.

The connection pins 810 may be connected to the mobile appliance 700 such that signals can be transceived between the mobile appliance 700 and the secure memory device 800. The connection pins 810 may include clock pins, command pins, data pins and/or reset pins.

The main processor 820 may be the data processing device 200 included in the integrated circuit 100 of FIG. 1. The main processor 820 includes a first register unit 822 to generate the address signal AS and a second register unit 824 to translate the first data DAT1 corresponding to the address signal AS into the second data DAT2. The first register unit 822 may include a first program counter block and the second register unit 824 may include a second program counter block. If a fault is injected into the first data DAT1 in a secure mode of the main processor 820, the second register unit 824 increases the faults in the second data DAT2 corresponding to the faults injected into the first data DAT1 to generate detectable errors. If the second data DAT2 are determined to be invalid due to the generation of the detectable errors, the operation of the main processor 820 may be finished or the secure interrupt may be performed. Therefore, the main processor 820 can be equipped with a self-check function to self-detect attacks or faults applied from the outside and can take countermeasures without reducing its operating rate and/or degrading its performance. In addition, the size and the power consumption of the secure memory device 800 can be reduced.

The secure memory device 800 may be a memory card, such as a multimedia card (MMC), an embedded MMC (eMMC), a hybrid eMMC, a secure digital (SD) card, a micro-SD card, a memory stick, an ID card, a personal computer memory card international association (PCMCIA) card, a chip card, a USB card, a smart card, a compact flash (CF) card, etc.

According to an exemplary embodiment of the inventive concept, the mobile appliance 700 may be any mobile system, such as a mobile phone, a smart phone, a tablet computer, a laptop computer, a personal digital assistant (PDA), a portable media player (PMP), a digital camera, a portable game console, a music player, a camcorder, a video player, a navigation system, etc.

Exemplary embodiments of the inventive concept can be applied to various devices and systems that may require security. For instance, exemplary embodiments of the inventive concept can be applied to various mobile appliances, such as a mobile phone, a smart phone, a tablet personal computer, a laptop computer, a PDA, a PMP, a digital camera, a music player, a portable game console and a navigation device.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A data processing device, comprising:
    a first register circuit configured to generate an address signal based on a first control signal, wherein the address signal points to a region in an external storage device where first data is stored;
    a second register circuit configured to receive the first data output from the external storage device, generate second data based on the first data and a second control signal, and selectively generate a detectable error in the second data according to an operating mode when a fault is injected into the first data, wherein a bit number of the detectable error in the second data is larger than a bit number of the fault injected into the first data; and
    a data handling circuit configured to selectively process the second data depending on whether the detectable error is generated,
    wherein the operating mode comprises a normal mode and a secure mode, and wherein the second register circuit generates the detectable error in the second data in the secure mode by increasing a fault in the second data, and does not generate the detectable error in the second data in the normal mode,
    wherein the first data comprises a normal code in the normal mode and a secure code in the secure mode, the normal code corresponding to instructions sequentially executable in the data processing device, the secure code being obtained by encrypting the normal code, the second data comprises the normal code in the normal and secure modes, and when the fault is injected into the first data in the secure mode, the fault in the second data is increased by increasing a number of error bits in the second data as the instructions are sequentially executed.

2. The data processing device of claim 1, wherein an operation of the data processing device is terminated or a secure interrupt is performed to protect data stored in the external storage device when the second data is determined to be invalid in the secure mode.

3. The data processing device of claim 1, wherein the first register circuit comprises:
    a program counter circuit configured to generate the address signal, which is sequentially increased, based on the first control signal.

4. The data processing device of claim 1, wherein the second register circuit comprises:

a program counter circuit configured to convert the second data into third data based on a translation table;

a mode selection circuit configured to generate fourth data based on the third data and a mode selection signal; and a calculation circuit configured to generate the second data based on the first data and the fourth data.

5. The data processing device of claim 4, wherein the mode selection circuit comprises:

an AND gate configured to generate the fourth data by performing an AND operation on the third data and the mode selection signal.

6. The data processing device of claim 5, wherein the operating mode comprises the normal mode and the secure mode, and wherein the fourth data is different from the third data in the normal mode and is the same as the third data in the secure mode.

7. The data processing device of claim 4, wherein the calculation circuit comprises:

an XOR gate configured to generate the second data by performing an XOR operation on the first data and the fourth data.

8. The data processing device of claim 7, wherein the operating mode comprises the normal mode and the secure mode, and the second data is the same as the first data in the normal mode and is different from the first data in the secure mode.

9. The data processing device of claim 1, further comprising:

a control circuit configured to generate the first control signal and the second control signal.

10. The data processing device of claim 1, wherein the data processing device comprises a microprocessor or a central processing unit (CPU).

11. The data processing device of claim 10, wherein the data handling circuit comprises a CPU state machine or an arithmetic and logic unit (ALU).

12. A secure memory device, comprising:

a data storage device configured to store first data; and a data processing device configured to generate an address signal pointing to a region in the data storage device where the first data is stored, and process second data corresponding to the first data received from the data storage device, wherein the data processing device comprises:

a first register circuit configured to generate the address signal based on a first control signal;

a second register circuit configured to receive the first data output from the data storage device, generate the second data based on the first data and a second control signal, and selectively generate a detectable error in the second data according to an operating mode when a fault is injected into the first data, wherein a bit number of the detectable error in the second data is larger than a bit number of the fault injected into the first data; and a data handling circuit configured to selectively process the second data depending on whether the detectable error is generated, wherein the operating mode comprises a normal mode and a secure mode, and wherein the second register circuit generates the detectable error in the second data in the secure mode by increasing a fault in the second data, and does not generate the detectable error in the second data in the normal mode, wherein the first data comprises a normal code in the normal mode and a secure code in the secure mode, the normal code corresponding to instructions sequentially executable in the data processing device, the secure code being obtained by encrypting the normal code, the second data comprises the normal code in the normal and secure modes, and when the fault is injected into the first data in the secure mode, the fault in the second data is increased by increasing a number of error bits in the second data as the instructions are sequentially executed.

13. The secure memory device of claim 12, wherein the data storage device comprises:

a first storage region configured to store the secure code; and a second storage region configured to store the normal code.

14. The secure memory device of claim 12, wherein an operation of the data processing device is terminated or interrupted when the bit number of the detectable error in the second data is larger than the bit number of the fault injected into the first data.

15. A data processing device, comprising:

a first register circuit configured to receive a first control signal and output an address to a data storage device in response to the first control signal;

a second register circuit configured to receive first data corresponding to the address from the data storage device and a second control signal, and output second data in response to the first data and the second control signal, wherein in a secure operating mode when the first data includes at least one fault bit, the second register circuit is configured to generate the second data to have more fault bits than the first data; and a data handling circuit configured to stop or interrupt an operation of the data processing device when the second data has more fault bits than the first data, wherein the second register circuit does not generate the second data to have more fault bits than the first data in a normal operating mode, wherein the first data comprises a normal code in the normal operating mode and a secure code in the secure operating mode, the normal code corresponding to instructions sequentially executable in the data processing device, the secure code being obtained by encrypting the normal code, the second data comprises the normal code in the normal and secure operating modes, and when the first data includes at least one fault bit in the secure operating mode, the fault bits in the second data are increased as the instructions are sequentially executed.

16. The data processing device of claim 15, wherein the data storage device is outside the data processing device.

17. The data processing device of claim 15, wherein the second data is generated to have more fault bits than the first data by providing an incremented address to the storage device and performing a logic operation on secure data associated with the incremented address and translation code corresponding to the incremented address.

18. The data processing device of claim 17, wherein the translation code is stored in a table in the second register circuit.

* * * * *